March 26, 1929.   O. C. REEVES ET AL   1,706,966
PREDETERMINED WEIGHT SCALE
Filed Aug. 28, 1926   2 Sheets-Sheet 2
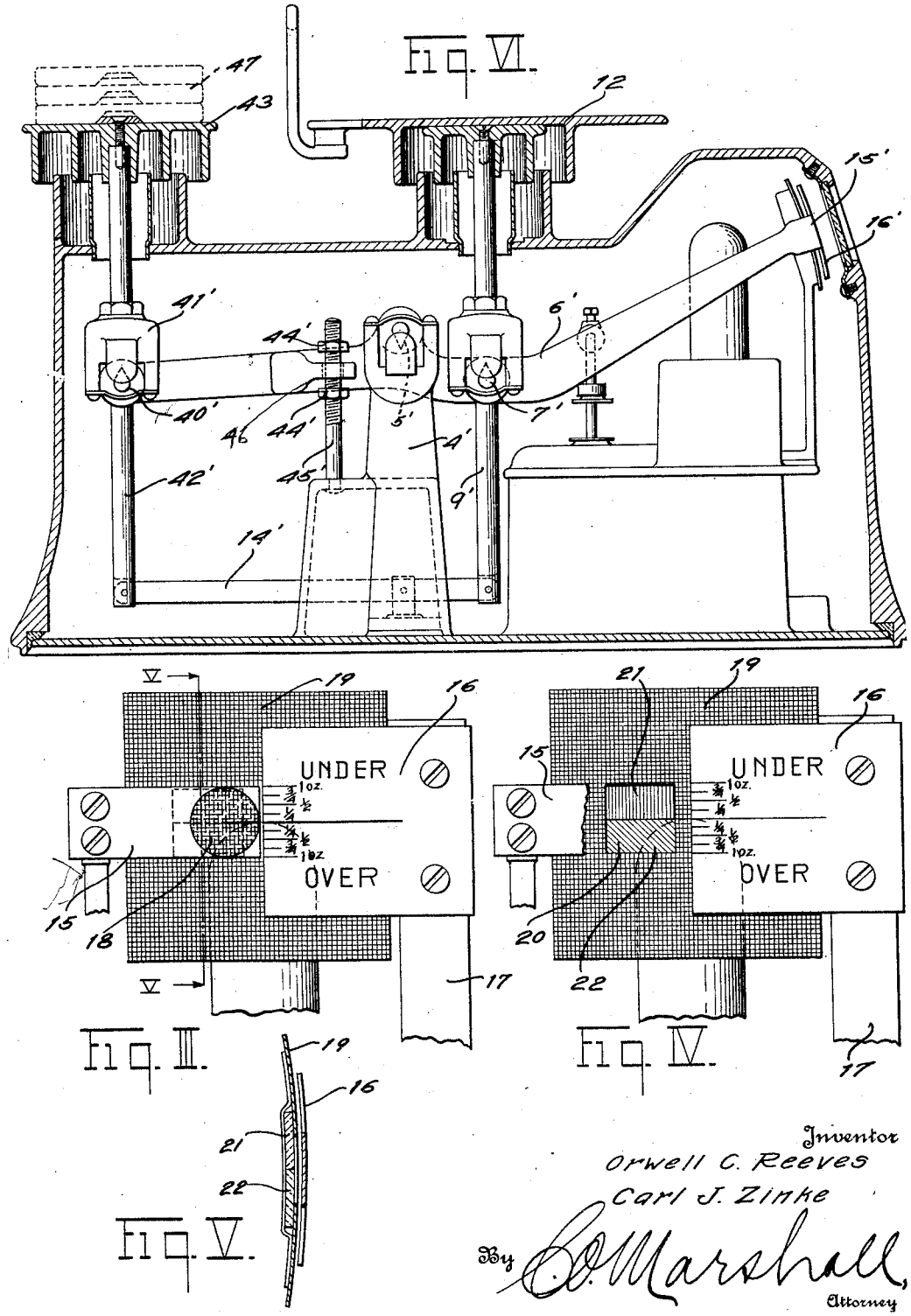
Inventor
Orwell C. Reeves
Carl J. Zinke
By E. O. Marshall,
Attorney Patented Mar. 26, 1929.

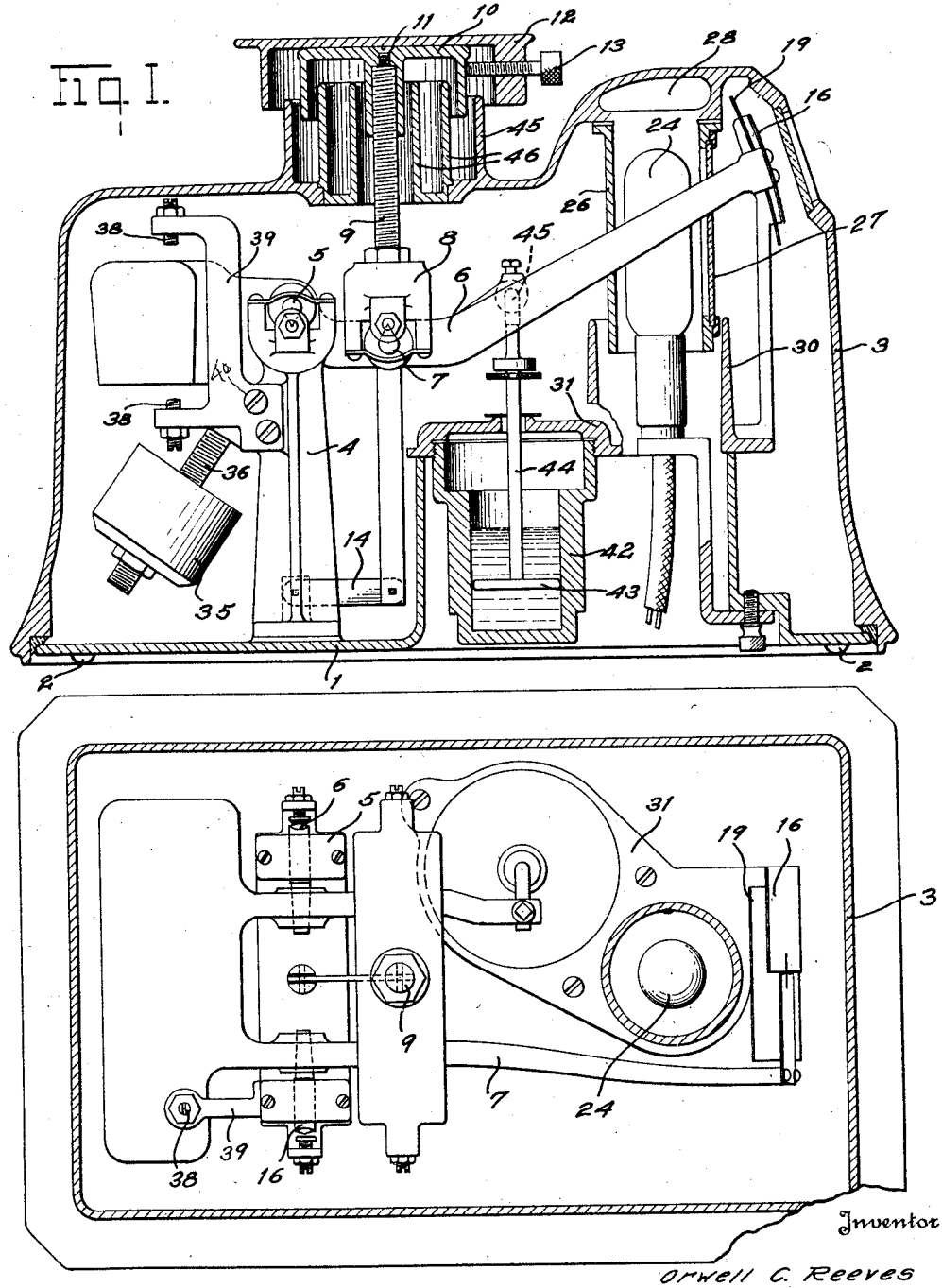

1,706,966

UNITED STATES PATENT OFFICE.

ORWELL C. REEVES AND CARL J. ZINKE, OF TOLEDO, OHIO, ASSIGNORS TO TOLEDO SCALE COMPANY, OF TOLEDO, OHIO, A CORPORATION OF NEW JERSEY.

PREDETERMINED-WEIGHT SCALE.

Application filed August 28, 1926. Serial No. 132,126.

This invention relates to weighing scales, and more particularly to scales of the class known as predetermined weight scales.

One of the principal objects of the invention is to provide a scale of this type which is particularly adapted for use in dairies for weighing prints of butter and is adaptable for use in other industries where the products consist of commodities which are required to be of substantially uniform weight.

Another object of the invention is the provision of a scale which is so constructed as to practically prevent the ingress of water into the scale housing when the same is being flushed with water.

Another object of the invention is the provision of a scale construction whereby the complete weighing mechanism may be assembled and sealed before it is placed in the housing.

A further object is the provision of a novel indicating means whereby the condition of the weight of a commodity as to being under or over a predetermined standard is indicated by the display of colored lights.

Still another object is the provision of a scale of this type which is simple in construction and inexpensive to manufacture and one in which there are very few parts to get out of order.

Other objects and advantages will be apparent from the following description, in which reference is had to the accompanying drawings illustrating preferred embodiments of the invention and wherein similar reference numerals designate similar parts throughout the several views.

In the drawings:—

Figure I is a vertical sectional elevational view through the scale;

Figure II is a horizontal sectional top plan view of the scale;

Figure III is an enlarged detail view of the indicating means forming a part of this invention;

Figure IV is a view similar to Figure III, parts being broken away for purposes of illustration;

Figure V is a detail sectional view taken substantially on the line V—V of Figure III; and Figure VI is a vertical sectional elevational view of a scale forming another embodiment of the invention.

Referring to the drawings in detail, the mechanism of the scale is supported upon a substantially rectangular plate 1 which is fixedly secured by means of screws 2 to a rectangular box-like housing 3 adapted to house the weighing mechanism. Erected upon the base 1 is a fulcrum stand 4 which supports the fulcrum pivots 5 of the lever 6. The lever 6 is also provided with load pivots 7 upon which is supported a spider 8, the latter having a threaded opening intermediate its ends adapted to receive a threaded member 9, the upper end of the member 9 supporting a cup-like member 10 secured thereto by means of a screw 11. A commodity-receiver or platter 12 is removably secured to the member 10 by means of a thumb screw 13. The platform or commodity-receiver 12 is maintained in a level position throughout weighing movements by means of a check link 14 pivoted at each end to a depending portion of the stem 9 and a projection secured to the fulcrum stand 4.

It is particularly desirable to provide a removable platter in order that the scale may be used for checking the weight of commodities of different weights. For this purpose a plurality of patters or commodity-receivers may be provided, each complementary to the desired weight of a commodity, so that when a light commodity is being weighed a heavy platter may be employed, the additional weight of the platter plus the weight of the commodity bringing the indicator to the predetermined weight mark.

Secured to the nose end of the lever 6 is a substantially rectangular indicating vane 15 which is adapted to co-operate with a chart 16 mounted upon a supporting bracket 17. The vane 15 is provided with a prominently colored circular spot 18 bearing a radial black line, which when the weight of the commodity on the platter is correct will be in registration with the predetermined weight line on the chart 16.

Positioned immediately back of the vane 15 and chart 16 is a rectangular sheet of metal 19 preferably colored black so as to provide a suitable background and thus render the indicator and chart conspicuous. The background 19 is provided with a substantially square opening 20 which is closed by means of two rectangular pieces of differently colored glass 21 and 22, the colors being preferably complementary, or at least contrasting, as, for example, red and green. Positioned adjacent and back of the windows 21 and 22 is a source of light 24, preferably an electric lamp, whose rays are visible through the windows as red and green lights. The electric lamp 24 may be enclosed by means of a tube 26 secured to the housing 2 in any suitable manner, the rays of light passing through a glazed window 27. Openings 28 in the upper part of the housing 2 provide a suitable means for ventilation so that the excess heat from the lamp may be dissipated without injuring the scale parts. The lower end of the tube 26 is telescoped into a tubular portion 30 of a bracket 31 so that any moisture or foreign matter entering the openings 28 will pass downward through the tubes 26 and 30 to the exterior of the base plate 1.

In the operation of the scale, a commodity placed upon the commodity-receiving platter causes the same to be depressed, and if the weight of the commodity is correct— i. e., equivalent to the predetermined weight—the indicating vane 15 will completely occult the red and green glasses, and the black line on the spot 18 will be in registration with the line on the chart 16. Should the commodity weigh less than the predetermined standard, the lever 6 will not be depressed as far and the vane 15 will not completely cover the opening 20 and a portion of the light passing through the green glass will be visible, the portion of the green light which is visible depending upon the amount of deviation in weight of the commodity from the predetermined standard, this weight being indicated by the graduation on the chart 16 in registration with the mark on the spot 18 of the indicating vane. If the weight of the commodity exceeds the predetermined standard the lever 6 will be further depressed and while the green light will be completely obscured from view, a portion or all of the red light will be visible, thus indicating an over-weight. In this way the deviation in weights of certain commodities of substantially the same weight may be readily and quickly ascertained, as any "over" or "under" weight of the commodity is instantly and prominently indicated by means of the colored lights. The lever 6 may be pendulated by the addition of the weight 35 adjustably secured upon a stem 36 threaded into the lever in juxtaposition to the fulcrum pivots 5. By employing a pendulated lever the lever may be sealed so that the indicator in registering with any certain graduation upon the chart 16 will indicate the correct amount of weight over or under the predetermined standard. Excess movement of the lever 6 is prevented by means of adjustable stops 38 located above and below the lever and secured to a bracket 39, the latter being rigidly fastened to a boss on the fulcrum stand 4 by means of screws 40. The oscillations of the lever 6 and associated mechanism are dampened by means of a dash pot 42 having a piston or plunger 43 operating in oil or other suitable fluid, the plunger rod 44 secured to the plunger 43 being pivotally connected to the lever, as at 45.

The portion of the scale housing adjacent the opening through which the spider stem 9 passes is formed into an upwardly projecting circular flange 45, and a bushing inserted in the opening is also provided with a pair of upwardly projecting circular flanges 46 of different diameters. The circular depending wall of the cup member 10 is telescoped between said flanges, thus forming a baffle to prevent the ingress of water or other foreign matter into the scale housing.

In the modified form of the scale illustrated in Figure VI the unit capacity of the scale may be changed without necessitating the shifting of platters of different weights. This scale comprises a lever 6' having fulcrum pivots 5' supported in the fulcrum stand 4', the load pivots 7 fixed to the lever suitably supporting the load-receiving platter 12'. One end of the lever is provided with the indicating mechanism 15', identical with that hereinbefore described, the other end of the lever being provided with pivots 40' supporting a spider 41', to which is secured a vertically extending rod 42', the upper end of the rod supporting a weight-receiving platform 43'. A check link 14' is connected at its ends to the lower extremities of the rods 9' and 42' and serves to maintain the load and weight-receiving platters in level position throughout weighing movements. The oscillatory movements of the lever 6' are limited by means of a pair of adjustable nuts 44' threaded upon a vertical rod 45' adapted to be engaged by a projection 46' forming an integral part of the lever.

It will be obvious that a load placed upon the platter 12' may be offset or counterbalanced by means of unit weights 47' indicated in dotted lines upon the platter 43' and the indicator will register with the predetermined mark on the chart if the weight of the load upon the platter 12' is equal to that of the unit counterbalancing weights.

It will be apparent that some differential load-counterbalancing means must be incorporated in the mechanism in order to take care of slight deviations from the predetermined standard in order that accurate indications of these variations in weight may be indicated upon the chart. This is accomplished by raising the fulcrum pivots 5' of the lever above the range line of the pivots— i. e., a straight line passing through the edges of the fulcrum, load and power pivots—and thus in effect lowering the center of gravity of the lever below the range line. This construction makes a pendulated lever which is capable of offsetting minor variations in weight of the commodity being tested, and by properly graduating the chart 16′ an accurate reading of such variations in weight from a predetermined standard in the commodity may be had. With this type of weighing mechanism it is possible to check the weight of commodities of varying standards by simply increasing or decreasing the number of unit weights upon the platform 43′.

The embodiments of the invention herein shown and described are to be regarded as illustrative only, and it is to be understood that the invention is susceptible to variation, modification and change within the spirit and scope of the subjoined claims.

Having described the invention, we claim:

1. In a device of the class described, in combination, weighing mechanism, indicating mechanism operatively connected to said weighing mechanism, said indicating mechanism comprising a movable vane, a stationary chart having an opening, and means whereby the movement of said vane operates to change the visible outline of said opening.

2. In a device of the class described, in combination, weighing mechanism including a load-receiving platform, indicating mechanism comprising a movable vane co-operating with said weighing mechanism, a stationary chart having an opening, and means whereby the movement of said vane operates to change the visible outline of said opening to indicate the relative weight of a load upon the platform.

3. In a device of the class described, in combination, weighing mechanism, indicating mechanism co-operating with said weighing mechanism, said indicating mechanism comprising a movable vane, a chart having an opening, means for displaying a colored light so as to be visible through said opening, and means whereby the movement of said members operates to change the visible outline of said opening.

4. In a device of the class described, in combination, weighing mechanism, indicating mechanism co-operating with said weighing mechanism, said indicating mechanism comprising relatively movable members, an opening in one of said members, means for displaying a plurality of colored lights so as to be visible through said opening, and means whereby the relative movement of said members operates to selectively render said colors visible.

5. In a device of the class described, in combination, weighing mechanism including a load-receiving platform, indicating mechanism co-operating with said weighing mechanism, said indicating mechanism comprising relatively movable members, an opening in one of said members, means for displaying a plurality of colored lights so as to be visible through said opening, and means whereby the relative movement of said members operates to selectively render said colors visible to indicate the relative weight of a load upon the scale platform.

6. In a device of the class described, in combination, weighing mechanism, a plurality of differently colored lights, and means whereby the position of said weighing mechanism is indicated by the hiding of one or more of said lights.

7. In a device of the class described, in combination, a lever, load and weight-receiving platters supported upon said lever, indicating mechanism operatively connected to said lever comprising a movable vane, a chart having an opening, and means whereby the relative movement of said members operates to change the visible outline of said opening.

8. In a device of the class described, in combination, a lever, load and weight-receiving platters supported upon said lever, indicating mechanism operatively connected to said lever comprising a movable vane, a chart having an opening, means for displaying a light so as to be visible through said opening, and means whereby the relative movement of said members operates to change the visible outline of said opening.

9. In a device of the class described, in combination, a lever, load and weight-receiving platters supported upon said lever, indicating mechanism operatively connected to said lever comprising relatively movable members, an opening in one of said members, means for displaying a plurality of colored lights so that they are visible through said opening, and means whereby relative movement of said members operates to render said colors selectively visible.

10. In a device of the class described, in combination, a lever, load and weight-receiving platters supported upon said lever, indicating mechanism operatively connected to said lever comprising relatively movable members, an opening in one of said members, means for displaying a plurality of colored lights so that they are visible through said opening, and means whereby said members are moved relatively to each other to render light of one color visible when the load on the load-receiving platter is greater than the load in the weight-receiving platter and another of said lights visible when the load on the load-receiving platter is less than the load on the weight-receiving platter.

ORWELL C. REEVES.
CARL J. ZINKE.